United States Patent Office 3,459,688
Patented Aug. 5, 1969

3,459,688
ETHER ADDITIVES IN THE POLYMERIZATION
OF ALKENE OXIDES
Henry L. Hsieh, Bartlesville, Okla., assignor to Phillips
Petroleum Company, a corporation of Delaware
No Drawing. Filed Dec. 27, 1966, Ser. No. 604,567
Int. Cl. C08g 23/06, 23/14
U.S. Cl. 260—2     9 Claims

ABSTRACT OF THE DISCLOSURE

The polymerization of epoxide compounds in the presence of a catalyst system comprising (a) an organoaluminum compound, (b) a metal salt of a beta-diketone, and (c) water is improved by conducting the polymerization reaction in the presence of a hydrocarbon diluent containing a saturated ether additive. The polymers produced have wide spread utility in the automobile industry for fabricating such articles as motor mounts, suspension system parts, hoses, tubing, and the like.

The invention relates to alkene oxide polymerization. In one aspect, this invention relates to catalyst systems for polymerizing epoxides. In another aspect, this invention relates to processes of polymerizing alkene oxides.

The processes described in the patent art and in the technical literature for polymerizing alkene oxides involve the use of a variety of different catalyst systems. Applicant's copending, commonly assigned application Ser. No. 462,113, filed June 7, 1965. now U.S. Patent No. 3,396,125, discloses a process for polymerizing alkene oxides with a catalyst system comprising an organoaluminum compound, a metal salt of a beta-diketone, and water. While this process represents a substantial advancement in the art of alkene oxide polymerization, continued research has resulted in the discovery of an improvement over the process of applicant's copending application. This improvement forms the subject matter of the present invention.

According to this invention, the polymerization of alkene oxides in the presence of a catalyst system comprising an organoaluminum compound, a metal salt of a beta-diketone, and water is improved by conducting the polymerization reaction in the presence of a hydrocarbon diluent containing a minor amount of an ether compound. The hydrocarbon diluent can be any suitable substituted or unsubstituted aromatic, aliphatic, or cycloaliphatic compound. The presence of a minor amount of an ether compound in the hydrocarbon diluent quite unexpectedly results in an increase in the polymerization rate, a decrease in the viscosity of the reaction mass, less coating of polymer on the reactor equipment, and easier polymer recovery.

Accordingly, it is an object of this invention to produce alkene oxide polymers. Another object of this invention is to provide an improved process of polymerizing alkene oxides. A further object of this invention is to provide an additive in the diluent for the polymerization of alkene oxides. These and other objects of the invention will become apparent to one skilled in the art after studying the following detailed description and the appended claims.

Any suitable alkene oxide can be polymerized in the practice of this invention. For example, alkene oxides containing up to and including 20 carbon atoms per molecule can be polymerized with the catalyst system and technique of the invention. Generally, it is preferred that the alkene oxide monomer contain from about 2 to about 8 carbon atoms per molecule. Alkene oxides which can be polymerized in the practice of this invention are represented by the formula

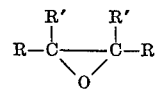

wherein R and R' are selected from the group consisting of hydrogen, saturated aliphatic, saturated cycloaliphatic, monoolefinic cycloaliphatic, diolefinic aliphatic (conjugated and nonconjugated), monoolefinic cycloaliphatic, diolefinic cycloaliphatic (conjugated and nonconjugated), and aromatic radicals and combinations of these such as aralkyl, alkaryl, and the like. Some or all of the R and R' radicals can be halogen-substituted, and can contain oxygen in the form of an acyclic ether linkage (—O—) or an oxirane group

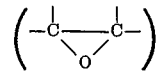

Further, the alkene oxides represented by the above formula can contain 1 or 2 olefinic linkages, 1 or 2 oxirane groups, and up to 1 ether linkage. In addition, both R' variables of the above formula can represent a divalent aliphatic hydrocarbon radical which, together with the carbon atoms of the oxirane group, can form a cycloaliphatic hydrocarbon nucleus containing from about 4 to about 10 carbon atoms and preferably from about 4 to about 8 carbon atoms.

Specific examples of some of the alkene oxides which are within the above structural formula and which can be homopolymerized or copolymerized in accordance with this invention are ethylene oxide (epoxyethane); 1,2-epoxybutane; 1,2-epoxypentane; 2,3-epoxypentane; 1,2-epepoxypropane (propylene oxide); 1,2-epoxybutane; 2,3-epoxybutane; 1,2-epoxypentane; 2,3-epoxypentane; 1,2-oxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1-bromo-2,3-epoxypropane; 1,5-dichloro-2,3-epoxypentane; 3-iodo-1,2-epoxybutane; styrene oxide; 6-oxabicyclo-[3.1.0] hexane; 7-oxabicyclo [4.1.0] heptane; 3-n-propyl-7-oxabicyclo [4.1.0] heptane; bis(2,3-epoxybutyl) ether; tert-butyl 4,5-epoxyhexyl ether; and 2-phenylethyl 3,4-epoxybutyl ether.

Unsaturated alkene oxides with in the above structural formula, including ethers, which can be homopolymerized or copolymerized with the saturated alkene oxides include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3:7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4:9,10-diepoxy-1,11-dodecadiene;
epoxyethyl vinyl ether;

allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5(4-methylcyclohexyl)3,4-epoxy-1-pentene;
4,5-diethyl-4,5-epoxy-2,6-octadiene;
4-(2,4-cyclopentadienyl)1,2:6,7-diepoxyheptane; and
1-phenyl-1,2-epoxy-5,7-octadiene.

The catalyst which is used to effect the polymerization reaction in the hydrocarbon diluent containing the ether additive comprises an organoaluminum compound, a metal salt of a beta-diketone, and water. The organoaluminum compound is represented by the formula $$R''_nAlX_m$$

wherein R'' is a hydrocarbon radical selected from the group consisting of saturated aliphatic, saturated cycloaliphatic, and aromatic containing from 1 to 20 carbon atoms, inclusive, and combinations such as alkaryl, aralkyl, and the like; X is a member of the class consisting of hydrogen, fluorine, chlorine, bromine, and iodine; n is an integer of from 1 to 3, inclusive; m is an integer of from 0 to 2, inclusive; and the sum of the integers n and m equals 3. Organoaluminum compounds within the above formula include triorganoaluminum compounds, organoaluminum monohalides, organoaluminum monohydrides, organoaluminum dihalides, organoaluminum dihydrides, and organoaluminum sesquihalides. The organoaluminum sesquihalides as herein defined are intended to mean a mixture of organoaluminum monohalides and organoaluminum dihalides of the formulas $R''_2AlX$ and $R''AlX_2$, respectively, wherein R'' is the same as hereinbefore defined with respect to the general formula and X is a halogen. The organoaluminum sesquihalides can then be written as $R''_3Al_2X_3$ or as $$R_{1\ 1/2}AlX_{1\ 1/2}$$

Exemplary organoaluminum compounds within the above formula include trimethylaluminum, triethylaluminum, tri-n-butylaluminum, triisobutylaluminum, tri-n-hexylaluminum, tri-n-decylaluminum, tri-n-eicosylaluminum, tricyclohexylaluminum, triphenylaluminum, methyldiphenylaluminum, ethyldi(3,5 - di-n-heptylphenyl)aluminum, tribenzylaluminum, tri-1-naphthylaluminum, di-n-octylphenylaluminum, tri - 4 - tolylaluminum, dimethylchloroaluminum, methyldichloroaluminum, n - heptyldifluoroaluminum, (3 - ethylcyclopentyl)diiodoaluminum, methylisobutylchloroaluminum, diphenylbromoaluminum, dibenzylchloroaluminum, di - n - octylchloroaluminum, n - octylphenylchloroaluminum, di-n-eicosyliodoaluminum, n - butyldihydroaluminum, methyldihydroaluminum, diisopropylhydroaluminum, ethylmethylhydroaluminum, diphenylhydroaluminum, benzyl-n-dodecylhydroaluminum, dicyclohexylhydroaluminum, 2,6-di-n - butyl-4-n-hexylphenyldihydroaluminum, and n-amylethylhydroaluminum.

The metal salt of the beta-diketone portion of the catalyst system can be rerpesented by the formula $$Me(-O-C=CH-CO-R''')_y$$
$$\qquad\quad |$$
$$\qquad\quad R'''$$

wherein Me is a metal selected from Groups II-A, III-A, IV-A, I-B, II-B, IV-B, V-B, VI-B, VII-B, and VIII of the Periodic Table of the Elements in the "Handbook of Chemistry and Physics," 45th edition, page B-2, The Chemical Rubber Company (1964); each R''' is a radical selected from the group consisting of saturated aliphatic, saturated cycloaliphatic, and aromatic, and combinations thereof, containing from 1 to 10 carbon atoms, inclusive; and y is an integer equal to the valence of the metal Me (Moeller, "Inorganic Chemistry," page 241, Wiley and Sons, 1952). Preferred metals within the above groups include calcium, strontium, barium, copper, beryllium, magnesium, zinc, cadmium, mercury, boron, aluminum, gallium, indium, thallium, silicon, germanium, tin, lead, silver, vanadium, chromium, molybdenum, tungsten, manganese, iron, cobalt, nickel, zirconium, and titanium.

Specific beta-diketones which can be combined with a metal from the above groups to form the corresponding metal salt include 2,4-pentanedione (acetylacetone); 3,5-heptanedione; 11,13-tricosanedione; 1,3-dicyclohexyl-1,3-propanedione; 1,5 - dicyclopentyl-2,4-pentanedione; 1,3-diphenyl - 1,3 - propanedione; 1,5-diphenyl-2,4-pentanedione; 2,8 - dimethyl-4,6-nonanedione; 1,3-di(4-n-butylphenyl)1,3 - propanedione; 1,11-diphenyl-5,7-hendecanedione; 1 - phenyl - 1,3-butanedione; 2,4-decanedione; and 1-(3,5-dimethylcyclohexyl)2,4-pentanedione.

The water which is used as the third component of the catalyst system functions in cooperation with the other components of the catalyst to produce high molecular weight rubbery polymers. The quantity of water used is based upon the organoaluminum component of the catalyst. Generally, the water is present in the catalyst system in an amount within the range of about 0.02 to about 1.6 mols per mol of organoaluminum compound, and preferably within the range of about 0.1 to about 1 mol per mol of organoaluminum compound.

The amount of catalyst employed for effecting the polymerization reaction of the alkene oxides can vary over a broad range. The catalyst concentration is determined on the basis of the organoaluminum compound present in the catalyst. As a general rule, the catalyst concentration is maintained within the range of about 1 to about 100 gram millimoles of organoaluminium compound per 100 grams of monomer, and preferably within the range of about 5 to about 40 gram millimoles of organoaluminum compound per 100 grams of monomer. In the copolymerization of two or more alkene oxide monomers, the amount of catalyst is based on the total amount of alkene oxide monomers.

The metal salt of the beta-diketone employed in the catalyst system is based on the amount of organoaluminum compound present. Generally, the mol ratio of the metal salt of the beta-diketone to the organoaluminum compound is within the range of about 0.01:1 to 0.5:1 and preferably within the range of about 0.03:1 to about 0.3:1. The metal salt of the beta-diketone can be used in a concentration outside of the range recited without departing from the spirit and scope of the invention.

The polymerization reaction of this invention can be conducted either as a batch or as a continuous process. The catalyst can be added in a single initial charge or in predetermined increments during polymerization. The catalyst system can be prepared by separately mixing the components and then charging the mixture to the reaction vessel or the catalyst components can be charged separately to the reaction vessel. Similarly, the alkene oxide monomers can be introduced into the reaction vessel in one charge or they can be added gradually during polymerization.

Any suitable hydrocarbon diluent can be used in the practice of this invention. Saturated aliphatic and saturated cycloaliphatic hydrocarbons as well as aromatic hydrocarbons can be used. Exemplary diluents include butane, pentane, hexane, decane, cyclopentane, cyclohexane, methylcyclohexane, benzene, toluene, xylene, ethylbenzene, and the like. Halogenated hydrocarbons such as chlorobenzene can also be used if desired.

The ether additives which are employed in the practice of this invention to improve the process are selected from the group represented by the formulas:

(1) $R^4-O-[R^5-O]_s-R^4$ (2) 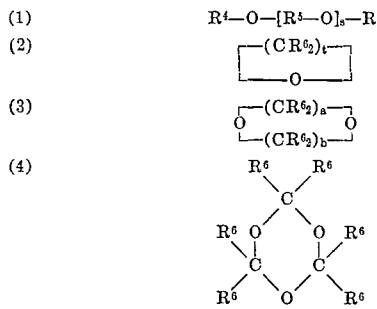

(3)

(4)

wherein $R^4$ is a hydrocarbon radical selected from the group consisting of saturated aliphatic, saturated cycloaliphatic, and aromatic containing from 1 to 19 carbon atoms, inclusive; $R^5$ is an alkylene radical containing from 1 to 18 carbon atoms, inclusive; $R^6$ is selected from the group consisting of hydrogen, saturated aliphatic, saturated cycloaliphatic, and aromatic radicals containing up to and including 10 carbon atoms each; $s$ is an integer from 0 to 9, inclusive; $t$ is an integer from 3 to 5, inclusive; $a$ and $b$ are integers from 1 to 3, inclusive, and the sum of $a$ and $b$ equals at least 3. In the above-named hydrocarbon radicals, combinations of the various types such as aralkyly, alkaryl, alkylcycloalkyl, and the like can be used.

Examplary ethers which can be used in the practice of this invention and which are within the scope of the above formulas include dimethyl ether, diethyl ether, ethyl methyl ether, ethyl n-propyl ether, di-n-propyl ether, di-n-octyl ether, dibenzyl ether, diphenyl ether, anisole, cyclohexyl methyl ether, tetramethylene oxide (tetrahydrofuran), 1,2-dimethoxyethane, paraldehyde, di-tert-decyl ether, methyl n-nonadecyl ether, isopropyl 4-tolyl ether, n-dodecyl 3-methyl-3-ethylcyclopentyl ether, di-n-propoxymethane, 4-methyl-3,6-dioxaoctane, 7-ethyl-4,10-dioxatetradecane, dimethyl ether of 1,9-nonanediol, dimethyl ether of 1,18-octadecanediol, oxacyclobutane, 3-methyloxacyclobutane, 3-phenyloxacyclobutane, 2,5-diethyloxacyclopentane, 3-benzyloxacyclopentane, oxacyclohexane, 4 - cyclohexyloxacyclohexane, 1,3-dioxane, 1,4-dioxane, 2,3,5,6 - tetramethyl-1,4-dioxacyclohexane, 5-decyl-1,3-dioxacyclohexane, 2,4,6-tri-n-butyl-1,3,5-trioxacyclohexane, 2-benzyl-1,3,5-trioxacyclohexane, 6,9,12,15-tetraoxatetracosane, 4,7,10,13,16,19 - hexamethyl - 2,5,8,11,14,17,20-heptaoxaheneicosane, and methyl nonadecyl ether.

The quantity of ether additive employed in the reaction is dependent upon a number of factors such as the type and amount of hydrocarbon diluent used, the particular ether additive used, and the monomer or monomers being polymerized. The ether used is generally within the broad range of about 0.5 to about 30 volume percent based upon the total volume of diluent including the ether additive and within the narrow range of about 1.5 to about 25 volume percent based upon the total volume of diluent including the ether additive. The ether additive can be preblended with the diluent and the mixture charged to a reaction vessel or the ether additive can be added to the reaction vessel separately.

The ether additives of this invention can be employed advantageously in both solution and suspension polymerization systems. When the polymerization reaction is conducted in an aromatic hydrocarbon diluent, the ether additive prevents the reaction mass from becoming viscous and from gelling. This results in an increase in the polymerization rate and eases recovery of the polymer. When the polymerization reaction is conducted in an aliphatic or cycloaliphatic diluent, the ether additive prevents the polymer from coating the reactor walls, the stirring mechanism, and the associated conduits. This advantage makes recovery of the polymer easier.

The ether additive of this invention is particularly advantageous when 80 percent by weight or more of the monomer feed is epichlorohydrin and an aliphatic or cycloaliphatic diluent is employed. Although the resulting polymer from this reaction precipitates as it forms, the ether additive prevents the polymer from coating the reactor walls.

The temperature and pressure at which the polymerization reaction is conducted can vary over a rather broad range. Generally, the reaction is conducted at a temperature within the range of about 40 to about 250° F. and preferably within the range of about 85 to about 200° F. Suitable temperatures outside of the broad range can be employed if desired. Polymerization is usually conducted at a pressure which will maintain the material substantially completely in the liquid state. The reaction can be conducted at super-atmospheric pressures of several thousand pounds if desired.

The duration of the reaction will depend primarily upon temperature, pressure, and the activity of the particular catalyst system being used. The process will usually be conducted for a period of from about one minute or less to about 100 hours or more. A narrower range within which the reaction can be conducted is between about 10 minutes and about 50 hours. Termination of the reaction, removal of the catalyst, recovery of polymer, etc., can be carried out by any suitable technique.

The alkene oxide polymers produced in accordance with the invention exhibit very good low temperature flexibility. The polymers are particularly resistant to the effects of heat and to the effects of ozone. The polymers have widespread utility in the automobile industry for fabricating such articles as motor mounts, body mounts, suspension system parts, hoses, tubing, and the like.

The following example will illustrate the improved results obtained by conducting the polymerization reaction in the presence of a hydrocarbon diluent having a minor amount of an ether additive. It must be understood that these examples are for the purpose of illustration only and that many variations and modifications can be made from them without departing from the spirit and scope of the invention.

Examples 1–3

A series of runs was conducted wherein allyl glycidyl ether was copolymerized with 1-chloro-2,3-epoxypropane (epichlorohydrin) by means of a catalyst system comprising triisobutylaluminum, zinc salt of 2,4-pentanedione, and water. The reaction was conducted in the presence of toluene diluent having variable amounts of tetramethylene oxide (tetrahydrofuran) as the ether additive. In each run, the materials were charged to a reactor in the following proportions:

| | |
|---|---|
| Epichlorohydrin, parts by weight | 90 |
| Allyl glycidyl ether, parts by weight | 10 |
| Toluene, parts by weight, (1500 ml.) | 1290 |
| Tetrahydrofuran (THF), parts by weight | Variable |
| Triisobutylaluminum (TBA), mhm.[1] | 20 |
| Zinc salt of 2,4-pentanedione (zinc acetylactonate), mhm.[1] | 3 |
| Water, mhm.[1] | 10 |
| Zinc salt:TBA mole ratio | 0.15:1 |
| $H_2O$:TBA mole ratio | 0.5:1 |
| Temperature, °F. | 158 |
| Time, hours | 6 |

[1] Gram millimoles per 100 grams monomer.

The technique employed for conducting the reaction involved charging the reactor with toluene and thereafter purging it with nitrogen. The epichlorohydrin, allyl glycidyl ether, and tetrahydrofuran were then charged to the reactor followed by the triisobutylaluminum, the zinc salt of 2,4-pentanedione, and the water. Polymerization was allowed to continue for 6 hours in each run. Each reaction mixture was terminated with a solution comprising, 2,2' - methylene - bis(4-methyl - 6 - tert-butylphenol) antioxidant in a mixture of equal parts by volume of toluene and isopropyl acohol. The mixture containing the antioxidant was used in an amount sufficient to provide approximately 1 part by weight of antioxidant per 100 parts by weight polymer. The polymers were coagulated in isopropyl alcohol, separated from the reaction mass, and dried. The polymers obtained in all of the runs were rubbers. Table I below illustrates the improved conversion rate obtained with different amounts of the ether additive.

Temperature, °F. _____ 158
Time, hours _____ 16

[1] Gram millimoles per 100 grams monomer.

The procedure used for conducting the polymerization reaction and for recovering the polymers in each of the runs was the same as that described in connection with Examples 1–3. All of the polymers produced were rubbers. Table II below illustrates the results for each of the runs.

TABLE II

|  | Toluene | | Tetrahydrofuran | | Monomer conversion, percent |
|---|---|---|---|---|---|
|  | P.h.m.[1] | Ml./100 g. monomer | Ml./100 g. monomer | Vol. percent of total diluent [2] |  |
| Example number: |  |  |  |  |  |
| Control | 1,290 | 1,500 | 0 | 0 | 30 |
| 4 | 1,290 | 1,500 | 25 | 1.6 | 46 |
| 5 | 1,290 | 1,500 | 50 | 3.2 | 69 |
| 6 | 1,290 | 1,500 | 100 | 6.3 | 69 |
| Control | 860 | 1,000 | 0 | 0 | 35 |
| 7 | 860 | 1,000 | 25 | 2.4 | 73 |
| 8 | 860 | 1,000 | 50 | 4.8 | 62 |
| 9 | 860 | 1,000 | 100 | 9.1 | 51 |

[1] Parts by weight (grams) per 100 grams monomer.
[2] Toluene plus tetrahydrofuran.

TABLE I

|  | Tetrahydrofuran | | Monomer conversion, wt. percent [2] |
|---|---|---|---|
|  | Ml./100 g. monomer | Vol. percent of tota diluent [1] |  |
| Example number: |  |  |  |
| Control | 0 | 0 | 25 |
| 1 | 50 | 3.2 | 60 |
| 2 | 100 | 6.3 | 60 |
| 3 | 200 | 11.8 | 42 |

[1] Toluene plus tetrahydrofuran.
[2] Weight percent of the monomer charged converted to polymer.

It is evident from the data in Table I that a much higher conversion rate was obtained when using tetrahydrofuran as the ether additive. In the control run the reaction mixture was in the form of a gelled mass.

Examples 4–9

Epichlorohydrin was copolymerized with ethylene oxide and allyl glycidyl ether by means of a catalyst system comprising triisobutylaluminum, zinc salt of 2,4-pentanedione, and water. Two series of runs were made, each using a different quantity of toluene as the diluent. Variable amounts of tetrahydrofuran as the ether additive were employed in each series of runs. In each run, the materials were charged to a reactor in the following proportions:

Epichlorohydrin, parts by weight _____ 70
Ethylene oxide, parts by weight _____ 20
Allyl glycidyl ether, parts by weight _____ 10
Toluene, parts by weight _____ Variable
Tetrahydrofuran (THF), parts by weight ____ Variable
Triisobutylaluminum (TBA), mhm.[1] _____ 25
Zinc salt of 2,4-pentanedione, mhm.[1] _____ 5
Water, mhm.[1] _____ 10
Zinc salt:TBA mole ratio _____ 0.2:1
H₂O:TBA mole ratio _____ 0.4:1

The monomer conversion was determined in the same manner as that described in Examples 1–3. By comparing the monomer conversion for each of the runs with their respective control run, it is evident that a much higher monomer conversion is obtained when an ether additive is employed in accordance with the invention. In both of the control runs a gelled reaction mixture was formed.

EXAMPLES 10–13

Epichlorohydrin was copolymerized with allyl glycidyl ether by means of a catalyst system comprising triisobutylaluminum, zinc salt of 2,4-pentanedione, and water. Cyclohexane was used as the diluent in each of the runs. Tetrahydrofuran was used as the ether additive in each of the runs. In each run, the materials were charged to a reactor in the following proportions:

Epichlorohydrin, parts by weight _____ 90
Allyl glycidyl ether, parts by weight _____ 10
Cyclohexane, parts by weight _____ Variable
Tetrahydrofuran, parts by weight _____ Variable
Triisobutylaluminum, mhm.[1] _____ 25
Zinc salt of 2,4-pentanedione, mhm.[1] _____ 6
Water, mhm.[1] _____ 20
Zinc salt:TBA mole ratio _____ 0.24:1
H₂O:TBA mole ratio _____ 0.8:1
Temperature, °F. _____ 158
Time, hours _____ 16

[1] Gram millimoles per 100 grams monomer.

The procedure used for conducting the polymerization reaction and for recovering the polymer was the same as that described in connection with Examples 1–3. All of the polymers were rubbers. The results obtained are reported in Table III below.

TABLE III

|  | Cyclohexane | | Tetrahydrofuran | | Monomer conversion, percent |
|---|---|---|---|---|---|
|  | P.h.m.[1] | Ml./100 g. monomer | Ml./100 g. monomer | Vol. percent of total diluent [2] |  |
| Example number: |  |  |  |  |  |
| Control | 780 | 1,000 | 0 | 0 | 22 |
| 10 | 624 | 800 | 200 | 20 | 79 |
| 11 | 780 | 1,000 | 200 | 16.7 | 83 |
| 12 | 780 | 1,000 | 400 | 28.6 | 69 |
| 13 | 1,170 | 1,500 | 200 | 11.8 | 85 |

[1] Parts by weight (grams) per 100 grams monomer.
[2] Cyclohexane plus tetrahydrofuran.

From the data in Table III, it is evident that a much higher monomer conversion can be achieved when an ether additive is employed during the polymerization reaction. In Examples 10, 11, and 13, the reaction mixtures were in the form of fluid slurries at 158° F. The reaction mixtures were cooled to room temperature and the polymer was easily recovered from the reactor. The reaction mixture in Example 12 had the appearance of a solution and likewise presented no difficulties in recovering the polymer. In the control run reported in Table III, the polymer coated on the walls of the reactor and made recovery difficult.

EXAMPLES 14–16

Epichlorohydrin was polymerized by means of a catalyst system comprising triisobutylaluminum, zinc salt of 2,4-pentanedione, and water. The polymerization reaction was conducted in the presence of toluene as diluent. Variable amounts of diethyl ether additive were used with the toluene diluent. The materials were charged to a reactor in the following proportions in each of the runs:

| | |
|---|---|
| Epichlorohydrin, parts by weight | 100 |
| Toluene, parts by weight, (1000 ml.) | 860 |
| Diethyl ether, parts by weight | Variable |
| Triisobutylaluminum, mhm.[1] | 20 |
| Zinc salt of 2,4-pentanedione, mhm.[1] | 4 |
| Water, mhm.[1] | 12 |
| Zinc salt:TBA mole ratio | 0.2:1 |
| $H_2O$:TBA mole ratio | 0.6:1 |
| Temperature, °F. | 158 |
| Time, hours | 3.5 |

[1] Gram millimoles per 100 grams monomer.

The procedure used for conducting the polymerization reaction and for recovering the polymer was the same as that described in Examples 1–3. All polymers were rubbers. The results of the several runs are reported in Table IV below.

TABLE IV

| | Diethy ether | | Monomer conversion percent |
|---|---|---|---|
| | Ml./100 g. monomer | Vol. percent of total diluent [1] | |
| Example number: | | | |
| Control | 0 | 0 | 60 |
| 14 | 50 | 4.8 | 77 |
| 15 | 100 | 9.1 | 83 |
| 16 | 200 | 16.7 | 92 |

[1] Toluene plus diethyl ether.

The data in Table IV show that various amounts of diethyl ether additive are effective for increasing the monomer conversion. The reaction mixture in the control run was in the form of a gelled mass and the resulting polymer was much more difficult to recover from the reactor than in the other runs. The polymers formed in Examples 14–16 remained fluid and were recovered very easily from the reactor.

While the invention has application in solution, slurry, and suspension type polymerization systems, certain advantages may be realized in some of the systems and not necessarily in other of the systems.

Although the invention has been described in considerable detail, it must be understood that such detail is for the purpose of illustration only and that many variations and modifications can be made in the invention without departing from the spirit and scope thereof.

I Claim:

1. In a process of producing a polymer of an epoxide compound wherein at least one alkene oxide of the formula

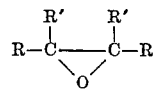

wherein each R and each R' is selected from the group consisting of hydrogen, saturated aliphatic, saturated cycloaliphatic, monoolefinic aliphatic, diolefinic aliphatic, monoolefinic cycloaliphatic, diolefinic cycloaliphatic, and aromatic radicals, halogen-substituted radicals of the foregoing type, and combinations thereof, and said radicals can contain oxygen in the form of an acyclic ether linkage (—O—) or an oxirane group

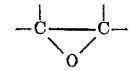

and said alkene oxide can contain 1 or 2 olefinic linkages, 1 or 2 oxirane groups, and 1 ether linkage, and both R' variable in said alkene oxide can represent a divalent aliphatic hydrocarbon radical which together with the oxirane group in said alkene oxide can form a cycloaliphatic nucleus is polymerized in a hydrocarbon diluent in the presence of a catalyst system comprising (a) an organoaluminum compound of the formula $$R''_n AlX_m$$

wherein $R''$ is a hydrocarbon radical selected from the group consisting of saturated aliphatic, saturated cycloaliphatic, and aromatic containing from 1 to 20 carbon atoms, inclusive; X is a member of the class consisting of hydrogen, fluorine, chlorine, bromine, and iodine; $n$ is an integer of from 1 to 3, inclusive; $m$ is an integer of from 0 to 2, inclusive; and the sum of the integers $n$ and $m$ equals 3:

(b) a metal salt of a beta-diketone of a metal selected from Groups II–A, III–A, IV–A, I–B, II–B, IV–B, V–B, VI–B, VII–B, and VIII of the Periodic Table; and (c) water;

the improvements comprising conducting the polymerization reaction in the presence of a saturated ether additive present in an amount within the range of about 0.5 to about 30 volume percent based upon the total volume of diluent including said saturated ether additive.

2. A process according to claim 1 wherein the saturated ether additive is selected from the group represented by the formula (1) $R^4-O-[R^5-O]_s-R^4$ (2) 

(3) 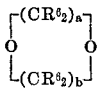

(4) 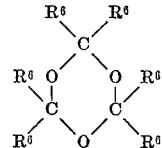

wherein $R^4$ is a hydrocarbon radical selected from the group consisting of saturated aliphatic, saturated cycloaliphatic, and aromatic containing from 1 to 19 carbon atoms, inclusive; $R^5$ is an alkylene radical containing from 1 to 18 carbon atoms, inclusive; $R^6$ is selected from the group consisting of hydrogen, aliphatic, cycloaliphatic, and aromatic radicals containing up to and including 10 carbon atoms each; $s$ is an integer from 0 to 9, inclusive; $t$ is an integer from 3 to 5, inclusive; $a$ and $b$ are integers from 1 to 3, inclusive; and the sum of $a$ and $b$ equals 3.

3. A process according to claim 2 wherein the metal salt of a beta-diketone is represented by the formula

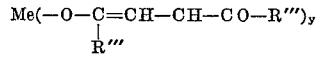

wherein Me is a metal selected from Group II–A, III–A, IV–A, I–B, II–B, IV–B, V–B, VI–B, VII–B, and VIII of the Periodic Table; each $R'''$ is a radical selected from the group consisting of saturated aliphatic, saturated cycloaliphatic, and aromatic containing from 1 to 10 carbon atoms, inclusive; and $y$ is an integer equal to the valence of the metal Me; and wherein the water is present in an amount within the range of about 0.02 to about 1.6 moles per mole of organoaluminum compound.

4. A process according to claim 3 wherein the organoaluminum compound is present in an amount within the range of about 1 to about 100 gram millimoles per 100 grams of alkene oxide; and wherein the mole ratio of the metal salt of the beta-diketone to the organoaluminum compound is within the range of about 0.01:1 to about 0.5:1.

5. The process according to claim 1 wherein said polymer is formed as a suspension in said diluent.

6. The process according to claim 4 wherein at least one of said alkene oxides is epichlorohydrin.

7. The process according to claim 6 wherein said epichlorohydrin is copolymerized with allyl glycidyl ether.

8. The process to claim 7 wherein said diluent is cyclihexane and said saturated ether additive is tetrahydrofuran.

9. The process of claim 8 wherein said catalyst system comprises triisobutylaluminum and the zinc salt of 2,4-pentanedione and water.

References Cited

UNITED STATES PATENTS 3,135,705   6/1964   Vandenberg.

WILLIAM H. SHORT, Primary Examiner

T. PERTILLA, Assistant Examiner

U.S. Cl. X.R.

260—88